United States Patent
Sakamoto

(10) Patent No.: US 7,192,090 B2
(45) Date of Patent: Mar. 20, 2007

(54) RECLINER ADJUSTER

(75) Inventor: Yutaka Sakamoto, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 86 days.

(21) Appl. No.: 11/174,563

(22) Filed: Jul. 6, 2005

(65) Prior Publication Data

US 2006/0006717 A1   Jan. 12, 2006

(30) Foreign Application Priority Data

Jul. 7, 2004   (JP) .............................. 2004-200647

(51) Int. Cl.
*B60N 2/23* (2006.01)
*B60N 2/42* (2006.01)
*B60N 2/433* (2006.01)

(52) U.S. Cl. ............ 297/362.14; 297/362; 297/362.11; 297/216.1; 297/216.13; 297/216.14

(58) Field of Classification Search ................ 297/362, 297/362.11, 362.14, 216.1, 216.13, 216.14, 297/216.15, 216.16
See application file for complete search history.

(56) References Cited

U.S. PATENT DOCUMENTS

| | | | | |
|---|---|---|---|---|
| 4,685,735 A | * | 8/1987 | McFalls et al. | 297/362 |
| 5,005,906 A | * | 4/1991 | Suzuki et al. | 297/362 |
| 5,123,703 A | * | 6/1992 | Morris et al. | 297/362 |
| 5,163,734 A | * | 11/1992 | Hakansson | 297/362 X |
| 5,435,624 A | * | 7/1995 | Bray et al. | 297/362.11 |
| 6,764,136 B2 | * | 7/2004 | Sakamoto | 297/362.14 |
| 6,976,738 B2 | * | 12/2005 | Sakamoto | 297/362.14 |

FOREIGN PATENT DOCUMENTS

| | | |
|---|---|---|
| JP | 42-7950 | 4/1967 |
| JP | 10-217817 | 8/1998 |
| JP | 2000-342371 | 12/2000 |

* cited by examiner

*Primary Examiner*—Rodney B. White
(74) *Attorney, Agent, or Firm*—Wenderoth, Lind & Ponack, L.L.P.

(57) ABSTRACT

A recliner adjuster for appropriately adjusting an inclination of a seat back with respect to a seat cushion includes a worm rotatably mounted on the seat cushion, and a helical gear held in engagement with the worm and mounted on the seat back via an auxiliary locking mechanism. The auxiliary locking mechanism includes a pair of external gears connected to the helical gear and held in engagement with a portion of the seat back, and a pair of internal teeth mounted on the seat cushion so as to accommodate the pair of external gears therein, respectively. During normal use, the seat back is held at a predetermined angle with respect to the seat cushion by the engagement of the helical gear with the worm, while when a load greater than a predetermined value is inputted to the seat back, the pair of external gears are partly deformed to engage with the pair of internal teeth, respectively, to thereby hold the seat back at the predetermined angle with respect to the seat cushion.

5 Claims, 3 Drawing Sheets

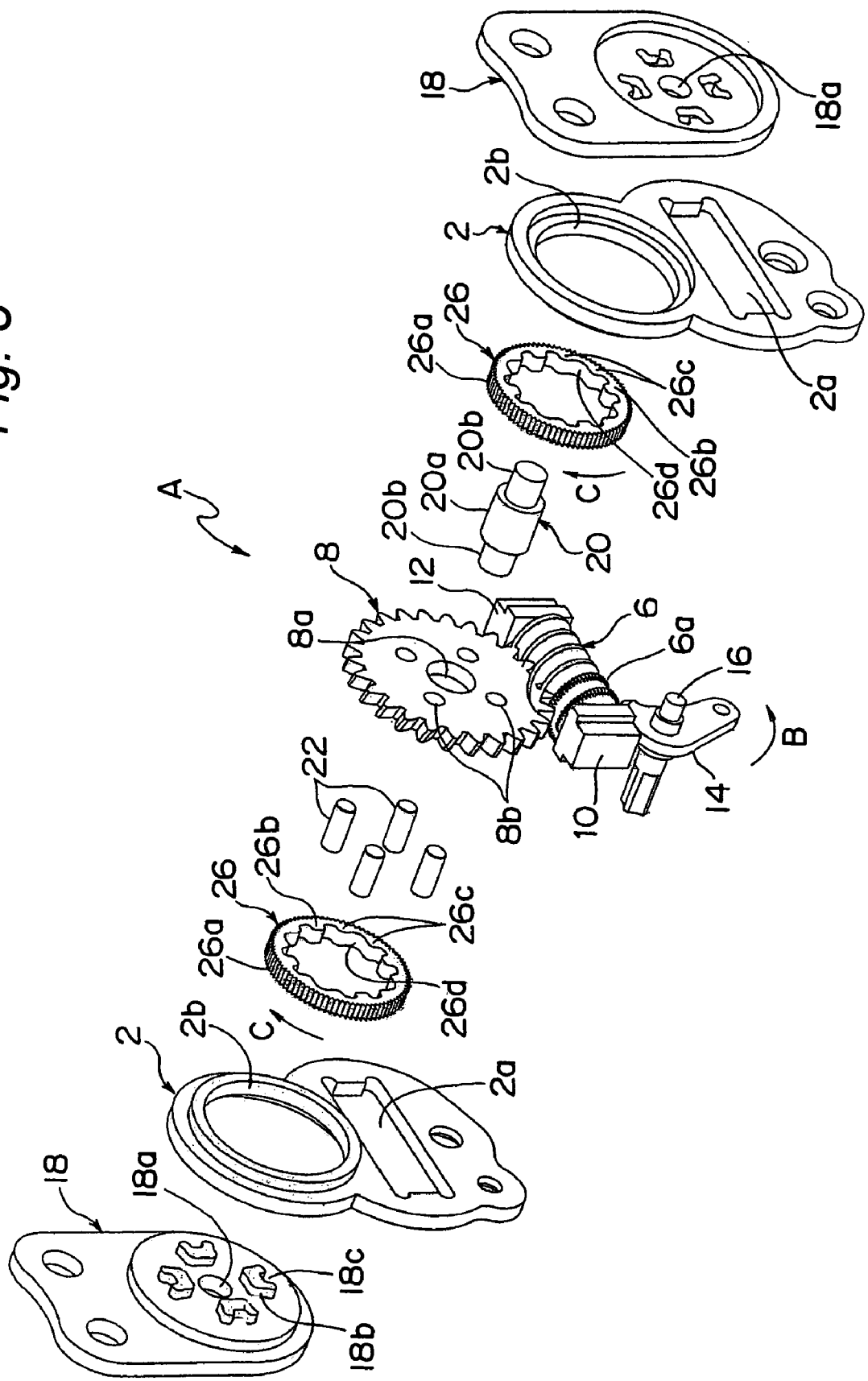

RECLINER ADJUSTER

BACKGROUND OF THE INVENTION

1. Field of the Invention

The present invention relates to a recliner adjuster attached to, for example, an automobile seat for appropriately adjusting inclination of a seat back with respect to a seat cushion.

2. Description of the Related Art

In a recliner adjuster disclosed in Japanese Utility Model Publication (examined) No. 42-7950, a sector gear is fixed to a seat back while a worm, which can be freely engaged with and disengaged from the sector gear, is rotatably attached to a seat cushion. The worm is connected to an operation shaft and, by pulling the operation shaft in the axial direction thereof and by subsequently lifting it up, the engagement between the worm and sector gear is released. When a load is applied to the seat back in this state, the seat back tilts and the inclination thereof can be altered quickly. When the hand is released from the operation shaft, the worm and sector gear reengage to hold the seat back in that position. In addition, if fine adjustment of the inclination of the seat back is required, when the operation shaft is rotated to rotate the worm, the sector gear held in engagement with the worm rotates gradually, making it possible to smoothly alter the seat back to a desired inclination.

In another recliner adjuster disclosed in Japanese Laid-Open Patent Publication (unexamined) No. 10-217817, a sector gear and a worm having a lead angle greater than a friction angle are attached to a seat back and a seat cushion, respectively. According to this recliner adjuster, by tilting the seat back, the worm is caused to rotate by way of the sector gear, making it possible to appropriately alter the inclination of the seat back.

However, in the recliner adjuster having a sector gear and a worm held in engagement with each other, a problem sometimes arises in that abnormal noise is generated by backlash which represents play between the teeth surfaces of the sector gear and worm.

To solve this problem, Japanese Laid-Open Patent Publication (unexamined) No. 2000-342371 has proposed reducing the backlash between the sector gear and worm.

In the above-described conventional recliner adjusters, if a large deceleration or acceleration is applied to the vehicle body due to, for example, a collision of the vehicle, a large load is applied to the mating surfaces of the sector gear and worm. In view of this, the strength required to withstand such a large load is ensured by employing a sector gear and a worm of a size greater than a predetermined size. That is, in order to enhance the strength of the recliner adjuster, it is necessary to enlarge not only the sector gear and worm but component parts associated therewith.

SUMMARY OF THE INVENTION

The present invention has been developed to overcome the above-described disadvantages.

It is accordingly an objective of the present invention to provide a compact recliner adjuster capable of withstanding a large load with the use of a worm and a gear having a strength required in normal use.

In accomplishing the above and other objectives, the recliner adjuster according to the present invention includes a worm rotatably mounted on a seat cushion, a helical gear held in engagement with the worm, and an auxiliary locking mechanism by way of which the helical gear is mounted on a seat back. The auxiliary locking mechanism includes a pair of external gears connected to the helical gear and held in engagement with a portion of the seat back, and a pair of internal teeth mounted on the seat cushion so as to accommodate the pair of external gears, respectively. During normal use, the seat back is held at a predetermined angle with respect to the seat cushion by the engagement of the helical gear with the worm, while when a load greater than a predetermined value is inputted to the seat back, the pair of external gears are partly deformed to engage with the pair of internal teeth, respectively, to thereby hold the seat back at the predetermined angle with respect to the seat cushion.

By this construction, a compact recliner adjuster capable of withstanding a large load can be realized using a worm and a helical gear having a strength required in normal use. Also, the compact construction enhances not only the freedom of layout but the appearance of the seat.

The portion of the seat back includes a pair of brackets to which the seat back is secured, wherein each of the pair of brackets has a plurality of protrusions formed therewith, and each of the external gears has a plurality of first protrusions held in engagement with the plurality of protrusions of associated one of the pair of brackets.

The recliner adjuster further includes a plurality of pins connected to the helical gear, wherein each of the external gears has two second protrusions formed therewith between two adjacent first protrusions, and each of the plurality of pins has opposite ends, each of which is received in a recess defined between the two second protrusions.

Advantageously, the pair of brackets are disposed on respective sides of the worm and the helical gear.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein:

FIG. 3 is an exploded perspective view of the recliner adjuster of FIG. 1.

DETAILED DESCRIPTION OF THE PREFERRED EMBODIMENTS

This application is based on an application No. 2004-200647 filed Jul. 7, 2004 in Japan, the content of which is herein expressly incorporated by reference in its entirety.

Figure 1:
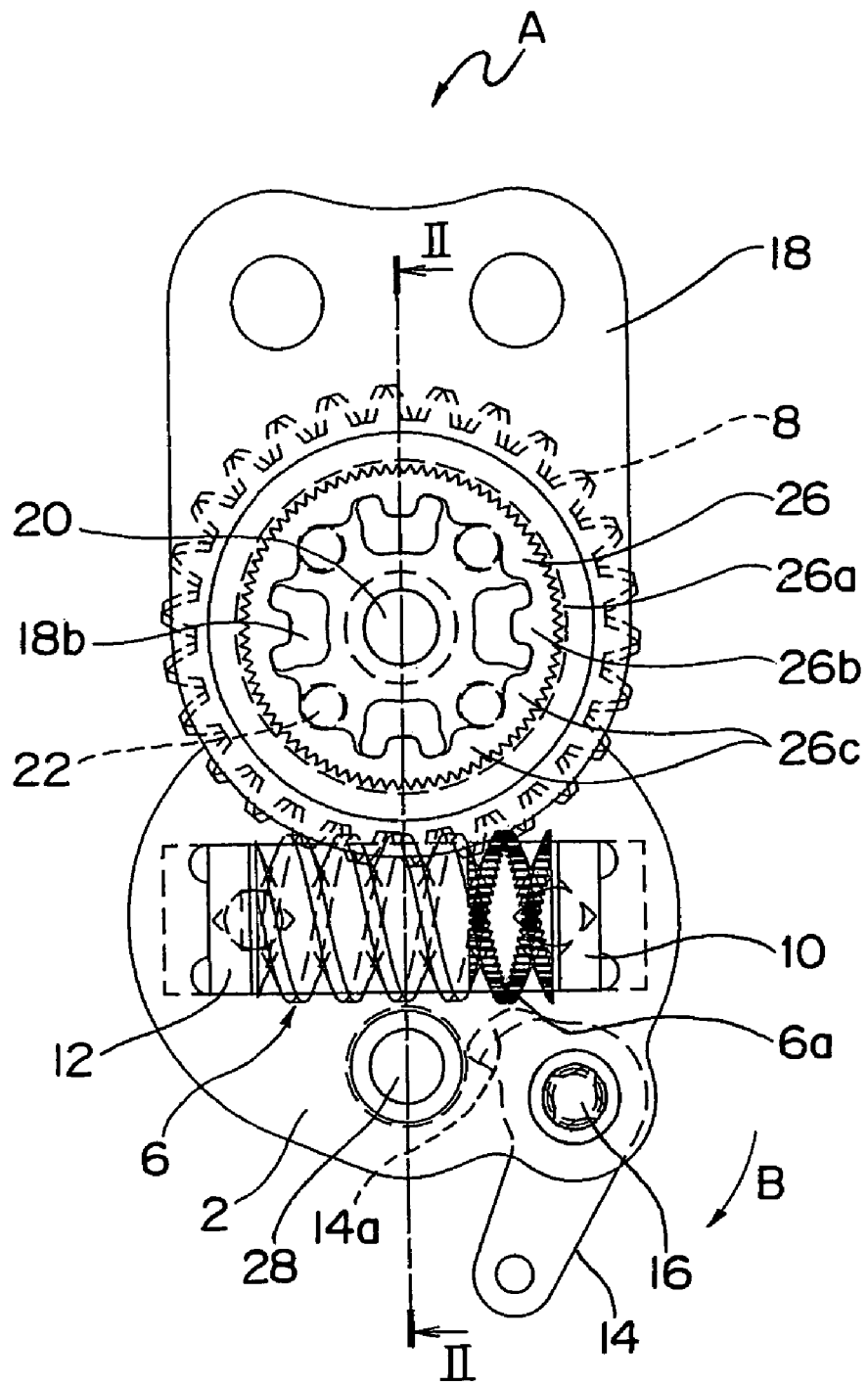
FIG. 1 is a front view of a recliner adjuster according to the present invention.
Figure 2:
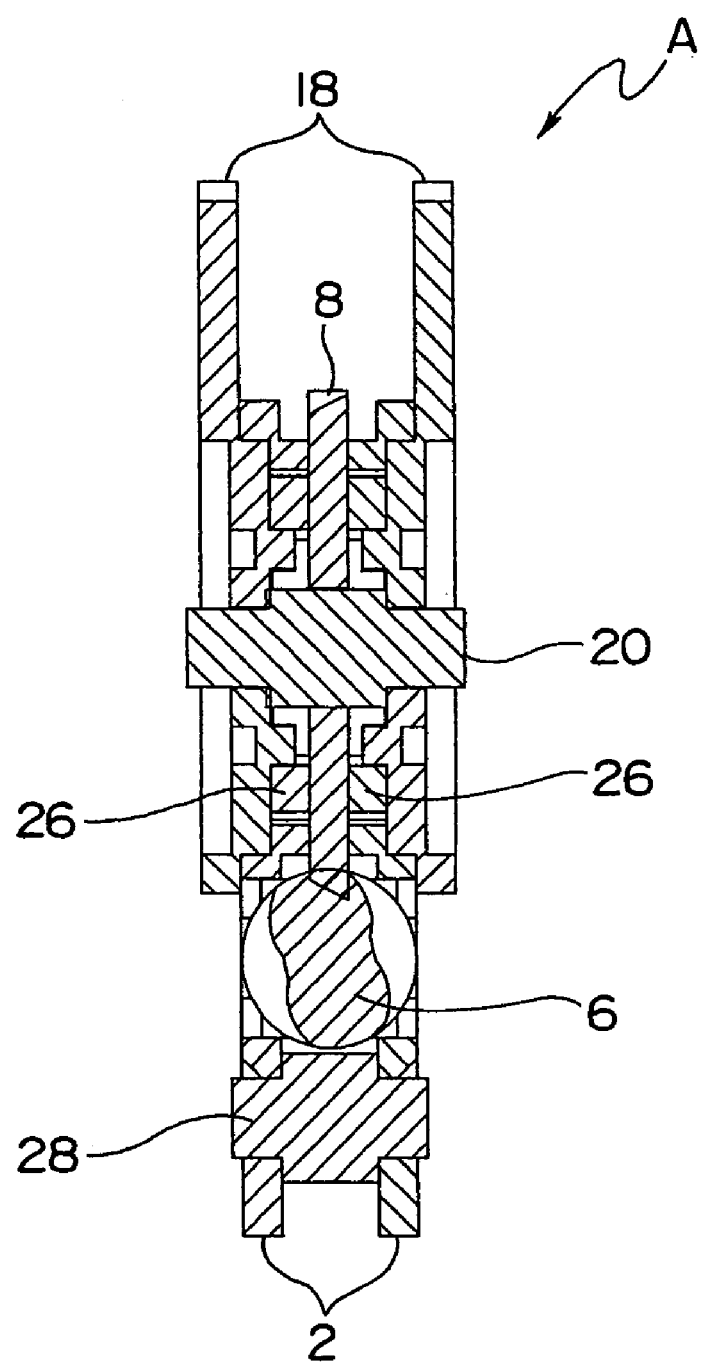
FIG. 2 is a sectional view taken along line II—II in FIG. 1.

FIGS. 1 to 3 depict a recliner adjuster A according to the present invention, which includes a pair of brackets 2, 2 spaced a predetermined distance so as to confront each other, a worm 6 rotatably mounted between the pair of brackets 2, 2, and a helical gear 8 held in engagement with the worm 6. The brackets 2, 2 are mounted on a seat cushion (not shown), while the helical gear 8 is mounted on a seat back (not shown) via a plurality of pins, an external gear, and a seat back-mounting bracket in a manner as explained later. The seat back is always biased frontward by an elastic force of a balance spring (not shown). Both the worm 6 and the helical gear 8 held in engagement with each other have a lead angle greater than a friction angle.

The worm 6 has a front end rotatably supported by a front bearing 10 and a rear end rotatably supported by a rear bearing 12, and both the front and rear bearings 10, 12 are secured to the brackets 2, 2. The brackets 2 have generally rectangular openings 2a, 2a defined therein at locations confronting the worm 6. The worm 6 partly protrudes externally through the openings 2a, 2a, thereby avoiding interference with the brackets 2, 2. That is, the presence of the openings 2a, 2a in the brackets 2, 2 can reduce the distance between the brackets 2, 2.

The worm 6 has a large number of notches 6a in the form of a gear on a tooth crest thereof positioned in the proximity to the front bearing 10. A locking member 14 is interposed between the brackets 2, 2 so as to rotate about a mounting shaft 16 secured to the brackets 2, 2. The locking member 14 has a locking piece 14a that confronts the notches 6a from below for engagement with the notches 6a. The locking member 14 also has an operating lever 14b with which the locking piece 14a can be manually moved up and down to lock or unlock the notches 6a. The locking member 14 is connected to an operating lever (not shown) that is manually operated to vertically move the locking piece 14a to lock or unlock the locking piece 14a with respect to the notches 6a. The locking piece 14a is always biased upwards (locking direction) by means of a biasing means (not shown) such as, for example, a coil spring.

The helical gear 8 has a round central hole 8a defined therein and is rotatably mounted on a central shaft 20. The central shaft 20 has a large-diameter portion 20a formed at a central portion thereof and two small-diameter portions 20b, 20b integrally formed with the large-diameter portion 20a at opposite ends thereof. The large-diameter portion 20a of the central shaft 20 is loosely inserted in the central hole 8a in the helical gear 8. A pair of brackets 18, 18, to which the seat back is secured, are rotatably mounted on the small-diameter portions 20b, 20b of the central shaft 20. The helical gear 8 also has a plurality of (for example, four) equally spaced pin holes 8b defined therein around the central hole 8a, and a pin 22 is received in each of the pin holes 8b.

Because the pair of brackets 2, 2 and the pair of brackets 18, 18 are disposed symmetrically on respective sides of the worm 6 and the helical gear 8 held in engagement with each other, the following explanation is given about only one side of the recliner adjuster A.

An external gear 26 is interposed between the helical gear 8 and the bracket 18 and brought into engagement with internal tooth 2b formed on the bracket 2 when a large load is inputted. The external gear 26 has external teeth 26a formed at an outer periphery thereof and a plurality of protrusions formed inside the external teeth 26a so as to protrude radially inwards. These protrusions include a plurality of (for example, four) first generally rectangular protrusions 26b formed at regular intervals in a circumferential direction of the external gear 26 and a plurality of (for example, eight) second arcuate protrusions 26c such that two second protrusions 26c are positioned as one set between two adjacent first protrusions 26b. One end of each pin 22 received in one of the pin holes 8b in the helical gear 8 is received in a recess 26d defined between such two second protrusions 26c.

The bracket 18 has a round central hole 18a defined therein in which one end (small-diameter portion 20b) of the central shaft 20 is loosely inserted. The bracket 18 also has a plurality of (the same number as the first protrusions 26b of the external gear 26) generally U-shaped protrusions 18b formed around the central hole 18a at regular intervals by press working so as to protrude towards the helical gear 8. The protrusions 18b have a recess 18c defined therein that has a shape complementary to that of the first protrusions 26b of the external gear 26.

The first protrusions 26b of the external gear 26 are each received in one of the recesses 18c so that the helical gear 8, the external gear 26, the bracket 18, and the seat back can rotate together about the central shaft 20. The external gear 26 is concentrically accommodated within the bracket 2 such that the external teeth 26a of the former confront the internal teeth 2b of the latter with a predetermined distance therebetween.

In FIGS. 1 and 2, reference numeral 28 denotes a connecting shaft for holding the two brackets 2, 2 in a mutually spaced relationship.

The recliner adjuster A of the above-described construction operates as follows.

Under the normal condition in which an operating lever connected to the locking member 14 is not operated, the locking member 14 is biased in the direction of an arrow B by an elastic force of a biasing means such as a coil spring, and the locking piece 14a is held in engagement with one of the notches 6a of the worm 6. Accordingly, rotation of the worm 6 is not allowed, preventing rotation of the helical gear 8 held in engagement with the worm 6. Because the external gear 26 is connected to the helical gear 8 via the pins 22, and the first protrusions 26b of the external gear 26 are held in engagement with the protrusions 18b of the bracket 18, inclination of the seat back relative to the seat cushion is held at a predetermined angle.

When a change in inclination of the seat back is desired, the operating lever is operated to rotate the locking member 14 in a direction counter to the direction of the arrow B against the elastic force of the biasing means. As a result, the engagement of the locking piece 14a with one of the notches 6a of the worm 6 is released, and the worm 6 is allowed to rotate freely.

Because both the worm 6 and the helical gear 8 held in engagement with each other have a lead angle greater than a friction angle, the worm 6 can rotate with rotation of the helical gear 8 about the central shaft 20. Accordingly, the seat back is inclined frontward by the elastic force of the balance spring, or inclined rearward by applying a rearward load to the seat back against the elastic force of the balance spring. When the hand is released from the operating lever at a desired position, the locking piece 14a of the locking member 14 is again brought into engagement with one of the notches 6a of the worm 6 by the elastic force of the biasing means, thereby preventing rotation of the worm 6 to hold the inclination of the seat back at the current angle.

A case where a large load greater than a predetermined value is inputted to the seat back due to, for example, a collision of the vehicle is discussed hereinafter.

If a large load greater than the loads during normal use is applied to the seat back, the load is transmitted from the seat back to the bracket 18, the external gear 26, the pins 22, and the helical gear 8 in this order. At this moment, the helical gear 8 is held in engagement with the worm 6 and is, hence, prevented from rotating. Accordingly, a large load is applied to the mating surfaces of the second protrusions 26c of the external gear 26 and the pins 22.

More specifically, if a large frontward load is applied to the seat back, the large load is applied to the second protrusion 26c adjacent to each of the pins 22 in a direction of an arrow C. On the other hand, if a large rearward load is applied to the seat back, the large load is applied to the second protrusion 26c adjacent to each of the pins 22 in a direction counter to the direction of the arrow C. As a result, any one of the second protrusions 26c positioned on respective sides of each pin 22 is pressed outward and deformed, and teeth surface positioned radially outward thereof is moved outward, thus causing the teeth formed on such teeth surface to be brought into engagement with the internal teeth 2b of the bracket 2. Accordingly, the seat back is prevented from further inclining frontward or rearward.

That is, even if a large deceleration or acceleration is applied to the vehicle body due to, for example, a collision of the vehicle, an auxiliary locking mechanism constituted by the pins 22, the external gear 26, the internal teeth 2b and the like prevents the seat back from abruptly inclining frontward or rearward.

As explained hereinabove, when a large load is inputted, the internal teeth 2b, 2b formed on the brackets 2, 2 and the corresponding external gears 26, 26 held by the brackets 18, 18 are brought into engagement with each other on respective sides of the worm 6 and the helical gear 8. Accordingly, even if the diameters of the internal teeth 2b, 2b and the external teeth 26a, 26a are small, the recliner adjuster according to the present invention can withstand the large load.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A recliner adjuster for appropriately adjusting an inclination of a seat back with respect to a seat cushion, comprising:

a worm rotatably mounted on the seat cushion;

a helical gear held in engagement with the worm; and an auxiliary locking mechanism by way of which the helical gear is mounted on the seat back, the auxiliary locking mechanism comprising:

a pair of external gears connected to the helical gear and held in engagement with a portion of the seat back; and a pair of internal teeth mounted on the seat cushion so as to accommodate the pair of external gears therein, respectively;

wherein during normal use the seat back is held at a predetermined angle with respect to the seat cushion by the engagement of the helical gear and the worm; and wherein when a load greater than a predetermined value is inputted to the seat back, the pair of external gears are partly deformed to engage with the pair of internal teeth, respectively, to thereby hold the seat back at the predetermined angle with respect to the seat cushion.

2. The recliner adjuster according to claim 1, wherein the portion of the seat back comprises a pair of brackets to which the seat back is secured, each of the pair of brackets having a plurality of protrusions formed therewith, each of the external gears having a plurality of first protrusions held in engagement with the plurality of protrusions of associated one of the pair of brackets.

3. The recliner adjuster according to claim 2, further comprising a plurality of pins connected to the helical gear, wherein each of the external gears has two second protrusions formed therewith between two adjacent first protrusions, each of the plurality of pins having opposite ends, each of which is received in a recess defined between the two second protrusions.

4. The recliner adjuster according to claim 3, wherein the pair of brackets are disposed on respective sides of the worm and the helical gear.

5. The recliner adjuster according to claim 2, wherein the pair of brackets are disposed on respective sides of the worm and the helical gear.

* * * * *